Patented May 5, 1931

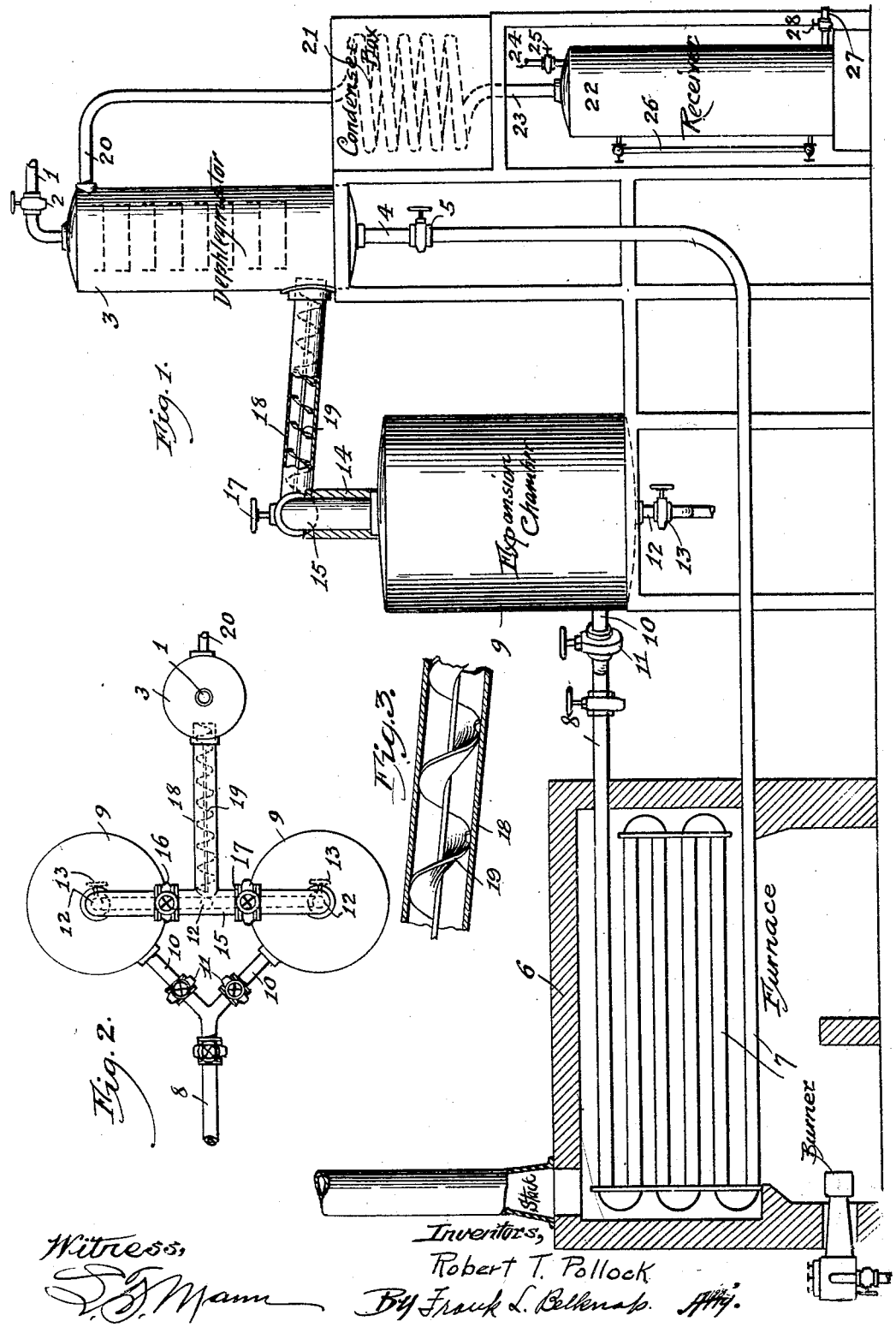

1,804,028

UNITED STATES PATENT OFFICE

ROBERT T. POLLOCK, OF NEW YORK, N. Y., ASSIGNOR TO UNIVERSAL OIL PRODUCTS COMPANY, OF CHICAGO, ILLINOIS, A CORPORATION OF SOUTH DAKOTA

APPARATUS FOR CRACKING OILS

Application filed March 14, 1921, Serial No. 452,096. Renewed February 5, 1927.

This invention relates to an apparatus for cracking hydrocarbon oils and refers more particularly to an improved means for dephlegmating the oil vapors released in the expansion chamber whereby the dephlegmating means may be reduced in size by inserting within the vapor line a coiled baffle for increasing the length of travel of the vapors and exposing them to a greater cooling and condensing surface.

Fig. 1 is a side elevation of the apparatus shown partly in section.

Fig. 2 is a plan view of the alternate expansion chambers and the associated connections, and Fig. 3 is a detailed sectional view of the vapor line and baffle.

The oil to be treated can be introduced from any convenient source (not shown) to the charging pipe 1 which is controlled by a valve 2 being introduced into the top of the dephlegmator 3. The raw oil serves as a dephlegmating medium, being passed in an opposed direction to the oil vapors which rise past the baffles within the dephlegmating column. The raw oil with what condensate it may collect in the dephlegmator or rectifier is drawn off through the line 4 in which is interposed the throttle valve 5. The line 4 connects directly with the inlet pipe to the cracking tubes 7, which are mounted in the furnace 6. The oil, after being heated to a cracking temperature in the heating tubes passes through the transfer line 8 to alternate expansion chambers 9 through the secondary connecting lines 10 in which are interposed valves 11. The expansion or vapor chambers 9 are equipped with residuum draw-off lines 12 regulated by valves 13. The expansion chambers may be alternately cut in or out of the system, the one being used while the other is being cleaned, thus providing a more continuous process.

The vapors released in the expansion chambers pass out through pipes 14 to a header 15 which is controlled by valves 16 and 17. This header is connected to the dephlegmator by means of the vapor line 18. Within the vapor line is positioned a spiral baffle plate 19 which may be a helical or a flat baffle and causes the vapors to take a circuitous passage through the vapor line and exposing the vapors in their travel to a greatly increased amount of pipe surface whereby an increased condensation or dephlegmation of the vapors is accomplished. The vapor line 18 is inclined toward the dephlegmator and the condensate which is separated out in the vapor line flows through suitable spaces provided at the lower edge of the baffle to the bottom of the dephlegmator and is drawn off with the raw oil and reflux from the dephlegmator to be retreated in the heating tubes.

The uncondensed portions of the vapors rise through the dephlegmator and are there subjected to further dephlegmation after which they pass off through the line 20 to a water condenser 21 where, after being reduced to a liquid, they are collected in a receiver 22 being conducted thereto through the line 23. The receiver is fitted with pressure relief pipe 24 controlled by a valve 25 and liquid level gauge 26 and a liquid draw-off line 27 regulated by a valve 28.

It is common practice in the oil industry to increase the exposure of the oil in the vapor lines to air by directing the vapors through a number of pipes such as in the harp construction of reflux condenser in which the vapors contact a greater amount of cool condensing surface or refluxing surface in their travel to the dephlegmator and condenser. By inserting or positioning a helical baffle within the vapor line a like result may be obtained due to the fact that the vapors in their travel through the vapor line, instead of passing directly through the line, are directed by means of the baffle in a spiral course, which exposes the vapors constantly to the cooler shell of the pipe. This means of rectification or dephlegmation not only permits the lessening of the area of rectifying surface in the dephlegmator but is a construction which accomplishes the same end as the plurality of pipes used as reflux condensers and at the same time produces the same effect upon the vapors treated. In addition to this, the spiral offers an advantage in cleaning in that the vapor line may be disconnected from the header and easily cleaned by simply removing the baffle from the line.

I claim as my invention:

1. An apparatus for cracking oil, comprising a conversion chamber and a dephlegmator, connecting means between the conversion chamber and the dephlegmator, said means consisting of a vapor line downwardly inclined from the point of connection to the said conversion chamber to the point of connection to said dephlegmator, and a helical baffling means arranged in said vapor line to form a circuitous path for the vapors passing therethrough.

2. An improvement in an apparatus for cracking hydrocarbon oil of the type in which the oil is heated in a coil and delivered to a reaction chamber, vapors passed from the reaction chamber to a dephlegmator, which comprises a vapor line connecting the reaction chamber with the dephlegmator, a continuous helical baffle positioned in said vapor line arranged to form a circuitous path for the vapors passing therethrough, said helical baffle having openings therethrough for the passage of condensate separated from the vapors flowing through said vapor line.

ROBERT T. POLLOCK.